(12) United States Patent
Waldhauser

(10) Patent No.: US 10,315,455 B2
(45) Date of Patent: Jun. 11, 2019

(54) SECURITY DOCUMENT WITH SECURITY FEATURE

(71) Applicant: Orell Füssli Sicherheitsdruck AG, Zürich (CH)

(72) Inventor: Armin Waldhauser, Zürich (CH)

(73) Assignee: ORELL FUSSLI SICHERHEITSDRUCK AG, Zurich (CH)

( * ) Notice: Subject to any disclaimer, the term of this patent is extended or adjusted under 35 U.S.C. 154(b) by 679 days.

(21) Appl. No.: 14/651,008

(22) PCT Filed: Dec. 10, 2012

(86) PCT No.: PCT/CH2012/000269
§ 371 (c)(1),
(2) Date: Jun. 10, 2015

(87) PCT Pub. No.: WO2014/089710
PCT Pub. Date: Jun. 19, 2014

(65) Prior Publication Data
US 2015/0328916 A1    Nov. 19, 2015

(51) Int. Cl.
*B42D 25/425*    (2014.01)
*G06K 9/00*    (2006.01)
(Continued)

(52) U.S. Cl.
CPC .......... *B42D 25/425* (2014.10); *B42D 25/00* (2014.10); *B42D 25/29* (2014.10); *B42D 25/30* (2014.10);
(Continued)

(58) Field of Classification Search
CPC ...... B42D 25/425; B42D 25/30; B42D 25/40; B42D 25/00; B42D 25/29; B42D 25/324;
(Continued)

(56) References Cited

U.S. PATENT DOCUMENTS

| 5,582,103 A | 12/1996 | Tanaka et al. |
| 6,036,233 A | 3/2000 | Braun et al. |

(Continued)

FOREIGN PATENT DOCUMENTS

| CA | 2 642 330 A1 | 8/2007 |
| CA | 2 816 384 A1 | 5/2012 |

(Continued)

OTHER PUBLICATIONS

International Preliminary Report on Patentability dated Jun. 16, 2015 for Application No. PCT/CH2012/000269.

(Continued)

*Primary Examiner* — Justin V Lewis
(74) *Attorney, Agent, or Firm* — Ladas & Parry LLP

(57) ABSTRACT

A security element for a security document comprises a first, second, third and fourth line grid which contrasts with the substrate surface, each of said grid being associated with a pattern comprising an embossed structure of the substrate. A first, second, third and fourth pattern angle differ from one another. A first security information item is coded as a first localized distribution of the first and second pattern, a second security information item is coded as a localized distribution of the third and the fourth pattern. The first and the second security information items overlap one another in the process. By disposing the first and second pattern in first grid cells and by disposing the third and fourth pattern in second grid cells and by arranging the first and second grid cells in alternating fashion, specific intensity distributions occur in different viewing directions of the security document, the intensity distributions being useful for examining the authenticity of the document.

23 Claims, 7 Drawing Sheets

(51) Int. Cl.
*B42D 25/30* (2014.01)
*B42D 25/40* (2014.01)
*B42D 25/00* (2014.01)
*B42D 25/29* (2014.01)
*B42D 25/324* (2014.01)

(52) U.S. Cl.
CPC ......... B42D 25/40 (2014.10); G06K 9/00483 (2013.01); *B42D 25/324* (2014.10); *B42D 2033/20* (2013.01); *B42D 2033/24* (2013.01); *B42D 2035/16* (2013.01); *B42D 2035/20* (2013.01); *B42D 2035/26* (2013.01); *B42D 2035/50* (2013.01)

(58) Field of Classification Search
CPC ............ B42D 2035/26; B42D 2035/16; B42D 2033/24; B42D 2035/50; B42D 2003/20; B42D 2035/20; G06K 9/00483
USPC .............................................. 283/72, 94, 98
See application file for complete search history.

(56) References Cited

U.S. PATENT DOCUMENTS

| | | | |
|---|---|---|---|
| 6,283,509 B1 * | 9/2001 | Braun | B42D 25/29 283/72 |
| 6,964,227 B2 | 11/2005 | Franz et al. | |
| 7,275,448 B2 | 10/2007 | Bitto et al. | |
| 2008/0272883 A1 | 11/2008 | Toda et al. | |
| 2012/0128900 A1 | 5/2012 | Furuie et al. | |

FOREIGN PATENT DOCUMENTS

| | | |
|---|---|---|
| CN | 1452549 A | 10/2003 |
| CN | 101421118 A | 4/2009 |
| CN | 101863193 A | 10/2010 |
| CN | 102463768 A | 5/2012 |
| EP | 1325816 | 7/2003 |
| JP | 2005-335153 A | 12/2005 |
| JP | 2010-197666 A | 9/2010 |
| KR | 10-2012-0086950 A | 8/2012 |
| WO | 2005/038499 A2 | 4/2005 |

OTHER PUBLICATIONS

English Abstract of EP1325816.
Espacenet English abstract of CN 101421118 A.
Espacenet English abstract of CN 102463768 A.
Espacenet English abstract and English translation of CN 101863193 A.
Espacenet English abstract of and English translation of JP 2005-335153 A.
Espacenet English abstract of and English translation of JP 2010-197666 A.
English translation of CA 2 816 384 A1.
Espacenet English abstract of KR 10-2012-0086950 A.
Espacenet English abstract of and English translation of WO 2005/038499 A2.

* cited by examiner

SECURITY DOCUMENT WITH SECURITY
FEATURE

CROSS-REFERENCE TO RELATED APPLICATION

This U.S. application claims priority under 35 U.S.C. 371 to, and is a U.S. National Phase application of, the International Patent Application No. PCT/CH2012/00269, filed 10 Dec. 2012. The entire content of the above-mentioned patent application is incorporated by reference as part of the disclosure of this U.S. application.

TECHNICAL FIELD

The invention relates to a security element for a security document, a security document comprising such a security element, a method for producing such a security element and a method for examining the authenticity of a security document that comprises such a security element according to the preamble of the independent claims. The invention is particularly suited for use in bank notes.

INTRODUCTION AND BACKGROUND ART

Security elements are typically applied to security documents such as bank notes, ID cards, certificates, checks, credit cards and the like in order to secure the security document against falsification and/or adulteration. Typical security elements include watermarks, perforations, security strips, holograms and so on, which are very difficult to reproduce. In general, security documents are provided with a number of security elements, some of which can be detected with the naked eye, and some of which can only be detected using external testing equipment, for example by viewing through incident light, transmitted light or ultraviolet light.

Documents U.S. Pat. No. 5,582,103 and EP 1 325 816 A2 disclose security elements for security documents, the elements revealing two different pieces of information by way of a specific combination of embossed line grids and printed line grids under two different angles of observation. When viewed straight on, the known prior art security element appears as a uniform gray surface, for example, whereas when viewed at an angle from a first direction a gray line appears on a bright background. Upon viewing at an angle from a second direction, the gray line appears on a dark background.

A disadvantage of the disclosed security elements is the relatively low amount of information contained therein.

DISCLOSURE OF THE INVENTION

It is therefore an object of the invention to provide an improved security element of the above-mentioned type having a greater information content. Further objects include providing a security document that comprises such a security element, a method for producing such a security element and a method for examining the authenticity of a security document which has such a security element.

These objects are achieved by a security element, a security document, a method for producing such a security element and a method for examining the authenticity of such a security document having such a security element having the features of the independent claims.

The security element according to the invention correspondingly comprises a substrate, such as a film or a paper, with a surface. At least one first, one second, one third and one fourth pattern with a first, a second, a third and a fourth pattern angle are disposed on the substrate. The term pattern angle refers to an alignment or orientation of the respective pattern parallel to the surface of the substrate. The pattern angles differ from one another.

The first, second, third and fourth pattern, respectively, further comprises an embossed structure on the substrate, which can be produced, for example, through blind embossing. The embossed structures are structured such as to make the patterns visible when the substrate surface is viewed straight on, and such that when the substrate surface is viewed at an angle from at least one predetermined viewing direction, at least a part of at least one of the patterns is hidden by at least a part of at least one of the embossed structures such that a visual latent image effect occurs when switching back and forth between the straight on and the oblique viewing of the substrate surface.

A first security information item is configured as a first localized distribution of the first and the second pattern. This first distribution, or first security information item, encompasses a first and a second area of the substrate, for example the first area outside a symbol and the second area inside the symbol. The first pattern and the second pattern are disposed in at least part of the first or second area, respectively. This allows the first security information item to be coded by way of the parts of the first and the second area in which the first and second patterns are disposed.

A second security information item is configured as a second localized distribution of the third and the fourth pattern. This second distribution, or second security information item, encompasses a third and a fourth area of the substrate, for example the third area outside a number and the fourth area inside the number. The third pattern and fourth pattern are disposed in at least part of the third or fourth area, respectively. This allows the second security information item to be coded by way of the parts of the third and the fourth area in which the third and fourth patterns are disposed.

According to the invention, the first security information item and the second security information item overlap at least partially. In other words, the first area and the third area can be designed to overlap, at least partially, and/or the second area and the fourth area can be designed to overlap, at least partially. This provides improved security of the security element since the overlap can increase the amount of information in the security element.

In a preferred embodiment, at least one of the patterns further comprises a grid, in particular a printed grid with at least one dye that contrasts with the substrate. This allows the degree of contrast of the pattern or patterns to be increased, which results in greater legibility. The grid or grids can also exhibit more than one dye that contrasts with the substrate and with each other. This enables grids to be configured specifically, which further increases security. For example, it is also possible to use fluorescing or phosphorescing dyes and/or coatings that are reflecting in at least one spectral range, which further increases security.

It is preferable for at least one of the grids and the embossed structure associated with the same pattern to run parallel to one another, at least in areas. This makes simpler implementation of the visual latent image effect, possible.

In another preferred embodiment, at least one of the grids, in particular all grids, is disposed on a side of the embossed structure of the pattern associated with the respective grid. In particular, the grid is predominantly disposed on the side or even exclusively on the side of the embossed structure of the pattern associated with the respective grid, which results in a specific configuration of the visual latent image effect and thereby improved security. For example, the patterns, together with the grids and embossed structures, are designed such that one of the respective grids appears visually different (for example with the gray tone remaining the same) than the other patterns (which, for example, change from gray to dark gray or from gray to light gray depending on the "viewing elevation angle", that is to say a polar angle of the viewing direction) from certain viewing directions relative to the respective pattern angle (for example for some of the viewing directions whose projection is parallel to the pattern angle on the substrate surface). In addition, as described above, at least one of the grids (and in particular all grids) is disposed on a side of the embossed structure associated with the respective grid. Other advantageous arrangements of at least one of the grids (and in particular all grids) predominantly on one side and/or exclusively on one side of the embossed structure associated with the respective pattern lead to a number of different configuration options. For concrete examples, reference is made to FIGS. 12, 15, 16, 17, 19, 20, 21 and 29 and the associated areas of the description of EP 1 325 816 A2, which are incorporated herein by reference. This provides a security feature which according to the invention is very dependent on the viewing direction.

It is preferred for at least one of the patterns to have a linear shape, at least in areas, whereby a visual latent image effect is achieved that is more easily legible.

In another preferred embodiment, the security element further comprises first grid cells. The first pattern and the second pattern are arranged within these first grid cells, preferably exclusively therein. This makes it possible to assign the first two patterns to the first grid cells.

In another preferred embodiment, the security element further comprises second grid cells. The third pattern and the fourth pattern are arranged within these second grid cells, preferably exclusively therein. This makes it possible to assign the third and fourth patterns to the second grid cells.

The first grid cells and the second grid cells are preferably arranged next to one another on the substrate in a non-overlapping fashion. This makes it possible to arrange the first and second grid cells next to one another on the substrate in a non-over lapping fashion and thereby to dispose the first and the second security information items on the security element by way of the respective patterns (i.e. the first and the second pattern for the first security information item and the third and the fourth pattern for the second security information item).

The first and the second grid cells are further preferred to not all be designed to be identical. For example, the group of first grid cells and the group of second grid cells both comprise first and second grid cell types that are differently designed, respectively, the cells preferably being designed such that the first grid cell types surround the second grid cell types, in other words the second grid cell types can be arranged inside the first grid cell types. This produces a more advantageous surface coverage by the grid cells.

It is preferable for the first and the second grid cells to be designed such that a total area covered by the first grid cells is from 50 to 150%, in particular from 70 to 130%, in particular from 98 to 102% of a total area covered by the second grid cells. This results in a more even coverage of the surface by the two types of grid cells.

It is preferable for the first grid cells and the second grid cells to be arranged on at least a part of the substrate in mutually alternating fashion and/or periodically or non-periodically repeating fashion, at least in a first direction parallel to the substrate (in particular in a first and in a second direction parallel to the substrate). This results in the ability to arrange the first, and second grid cells, and thereby the first and second security information items, on the substrate in distributed fashion over the entire substrate, wherein the first/second and the third/fourth areas do not have to be designed concurrently with the first and second security features, respectively.

In a preferred embodiment, the security element further comprises a third security information item that is designed as a localized variation of at least the first, the second, the third or the fourth pattern, in particular of the first and the second pattern. Such a localized variation of the pattern is preferred to be created by modulating a pattern parameter, for example by modulating a line width and/or an embossed structure depth. This makes it possible to reflect a gray scale (a gray scale image) as a third security information item, for example, the information item being used to disguise the first and second security information items so that the detection thereof is more difficult at first glance.

In another preferred embodiment, the security element further comprises a fifth pattern and a fourth security information item. This fourth security information item is designed as a combination of the fifth pattern with at least one pattern from the group of the first, second, third and fourth patterns. For example, the fifth pattern can be designed as an overlapping of the first to the fourth patterns with the fifth pattern including the embossed structure and optional grid thereof, so that a Moire effect results between the fifth pattern and one of the first four patterns from a suitable direction of view. This further increases the security of the security feature.

In another preferred embodiment, the substrate is designed to be at least partially transparent and at least one of the patterns is disposed on the first substrate surface with at least one of the remaining patterns being disposed on a second substrate surface opposite the first surface. This results in transparency effects that further increase the security of the security feature.

Another disclosed aspect of the invention is a security document with a security feature as described above. Such a security document, for example a bank note, has an increased security against falsification compared to prior art security documents since the security feature contains a greater number of information items.

Another aspect of the invention is disclosed in the form of a method for producing a security element as described above, the method comprising the following steps:
  applying a first pattern at a first, pattern angle, including a first embossed structure, onto at least part of a first area of a substrate,
  applying a second pattern at a second pattern angle, including a second embossed structure, onto at least part of a second area of a substrate,
  applying a third pattern at a third pattern angle, including a third embossed structure, onto at least part of a third area of a substrate,
  applying a fourth pattern at a fourth angle, including a fourth structure, onto at least part of a fourth area of a substrate.

It is preferred for the production method to comprise the further steps of
  applying a first, a second, a third and/or a fourth grid, each of which is associated with one of the patterns, in particular a line grid, onto the substrate.

The above pattern/grid application steps can comprise the blind embossing of film substrates, the embossing and optionally black-and-white or color printing of paper or plastic substrates, overprinting of screen-printed elements, OVI, OVMI, Iriodin, etc.

This can make a security feature according to the invention easier to produce.

Another aspect of the invention is disclosed in the form of a method for examining the authenticity of a security element as described above, the method comprising the following steps:

viewing the security document from a first viewing direction and comparing a first viewed intensity distribution with a first template (for example an expected "OFS" intensity distribution that is bright on a dark background), viewing the security document from a second viewing direction and comparing a second viewed intensity distribution with a second template (for example an expected "700" intensity distribution that is bright on a dark background), and using the first and the second viewed intensity distributions, classifying the security document as authentic or inauthentic.

It is preferred for the method for examining the authenticity to comprise the further steps of:

viewing the security document from a third viewing direction and comparing a third viewed intensity distribution with a third template (for example an expected "OFS" intensity distribution that is bright on a dark background), viewing the security document from a fourth viewing direction and comparing a fourth viewed intensity distribution with a fourth template (for example an expected "700" intensity distribution that is bright on a dark background), and using the third and the fourth viewed intensity distributions, classifying the security-document as authentic or inauthentic.

At this point, it is worth noting that in addition to the first to the fourth patterns other patterns can be disposed on the security element so as to provide further security information items that depend on the viewing direction. This can increase the information content even further.

The embodiments described relate equally to the product claims and to the method claims. As is obvious to one trained in the art, synergistic effects can arise when the features of different embodiments are combined, even though said effects may not be described in detail.

BRIEF DESCRIPTION OF THE DRAWINGS

Other advantageous embodiments of the invention are given in the dependent claims and the exemplary embodiments illustrated below with the aid of the drawings. Shown are:

MODES FOR CARRYING OUT THE INVENTION

Figure 1:
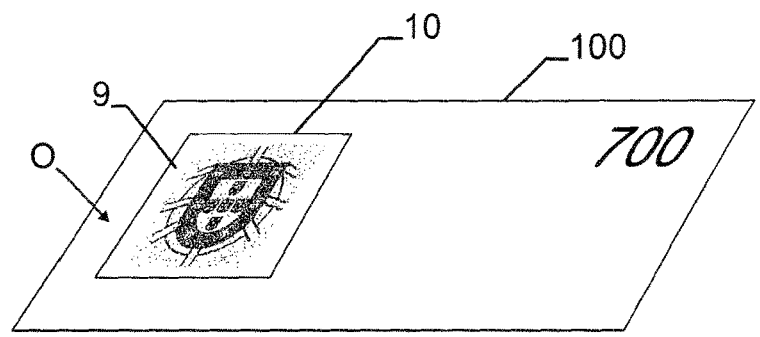
FIG. 1 showing a security document 100 according to the invention with a security feature 10 according to the invention, having a substrate 9 and a substrate surface O, FIG. 2 showing a first security information item I1 with a first area B1 and a second area B2, FIG. 3 showing the first security information item I1 from FIG. 2, the information item comprising the first area B1 with a first pattern M1, a first line grid R1 and a first embossed structure P1 and the second area B2 with a second pattern M2, a second line grid R2 and a second embossed structure P2, FIG. 4 showing a second security information item I2 with a third area B3 and a fourth area B4, FIG. 5 showing the second security information item I2 from FIG. 4, the information item comprising the third area B3 with a third pattern M3, a third line grid R3 and a third embossed structure P3 and the fourth area B4 with a fourth pattern M4, a fourth line grid R4 and a fourth embossed structure P4, FIG. 6 showing square grid cells RZ1, RZ2 on the substrate surface O, the cells being disposed in alternating fashion in a first and a second direction 99, 98, and parts of the areas B1-B4 comprising the line grids R1, R2, R3 and R4, FIG. 7 showing non-square grid cells RZ1, RZ2 in areas B1/B3, wherein the grid cells RZ1, RZ2 comprise first and second grid cell types RZA and RZB, respectively, wherein the first grid cell types RZA are designed such that they surround the second grid cell types RZB, FIG. 8 showing the areas B1, B2, B3 and B4 in combination with grid cells RZ1 and RZ2 from FIG. 7, wherein the patterns M1-M4 are disposed according to grid cells RZ1, RZ2 and areas B1-B4, FIG. 9 showing the surface O of a substrate 9 of a security feature 10 as viewed straight on, as well as four different oblique viewing directions A, B, C and D, FIG. 10 showing the surface O of the substrate 9 of the security feature from FIG. 9 in an oblique view from viewing direction A, FIG. 11 showing the surface O of the substrate 9 of the security feature from FIG. 9 in an oblique view from viewing direction B, FIG. 12 showing the surface O of the substrate 9 of the security feature from FIG. 9 in an oblique view from viewing direction C, FIG. 13 showing the surface O of the substrate 9 of the security feature from FIG. 9 in an oblique view from viewing direction D, FIG. 14 showing a third security information item I3 with a localized variation of a pattern parameter of a first grid R1, and FIG. 15 showing the third security information item I3 from FIG. 14 with a localized variation of a pattern parameter of a second grid R2.

FIG. 1 shows a security document 100 according to the invention (in this case a bank note) with a security feature 10 according to the invention. The security feature 10 comprises a substrate 9 with a substrate surface O and a schematically printed value of the Swiss Franc bank note "700".

Figure 2:
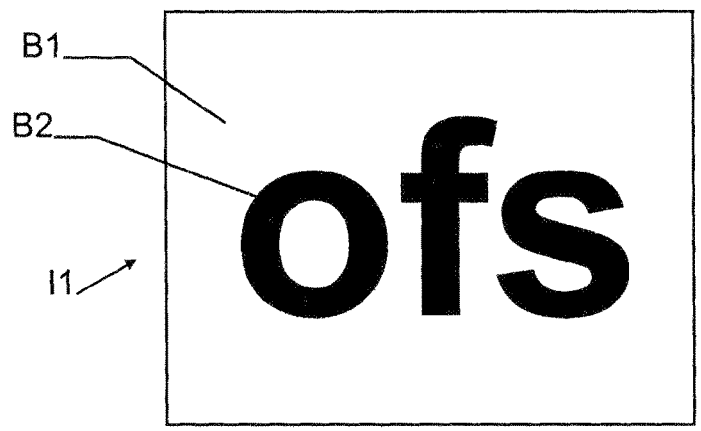

FIG. 2 shows a first security information item I1 ("ofs" lettering) with a first area B1 outside the lettering (white area) and a second area B2 inside the lettering (black area).

Figure 3:
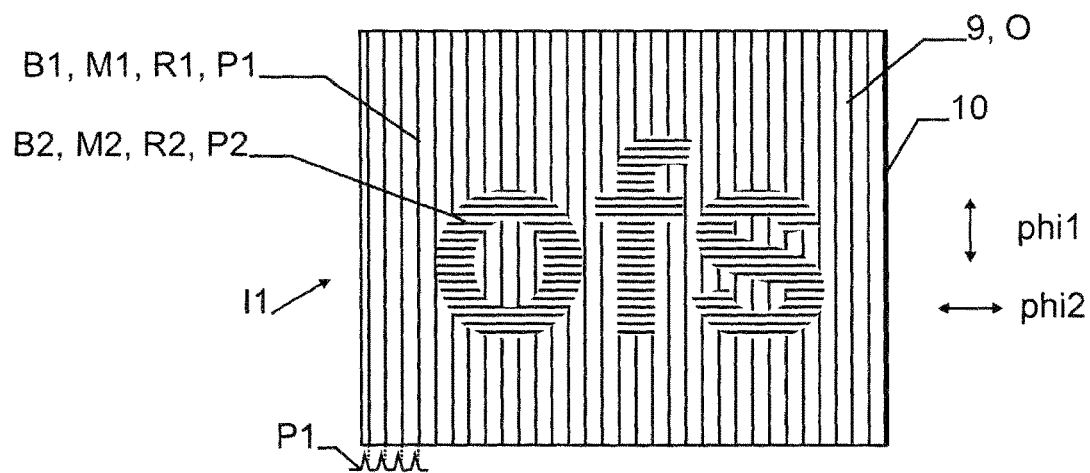

FIG. 3 shows the first security information item I1 from FIG. 2. Here, the first area B1 of the substrate 9 is provided with a first pattern M1 comprising a printed line grid R1 (vertical grid when viewing the figure straight on) on the substrate surface O and an embossed structure P1 (indicated as a cross area in the lower part of the figure) of the substrate 9. The embossed structure P1 has a variable embossed depth inside the embossing lines and between the embossing lines (neither are shown). Pattern M1 has a grid width of 35 lines per centimeter and a grid angle phi1=0° (measured relative to a vertical side of the substrate 9 counterclockwise) and is printed at a resolution of 8000 dpi onto the substrate. Other resolutions are also possible. The second area B2 of the substrate 9 is provided with a second pattern M2 comprising a printed line grid R2 (horizontal grid when viewing the figure straight on) on the substrate surface O and an embossed structure P2 (not shown) of the substrate 9. Pattern M2 has a grid width of 50 lines per centimeter and a grid angle phi2=90° (measured relative to a vertical side of the substrate 9 counterclockwise).

Figure 4:
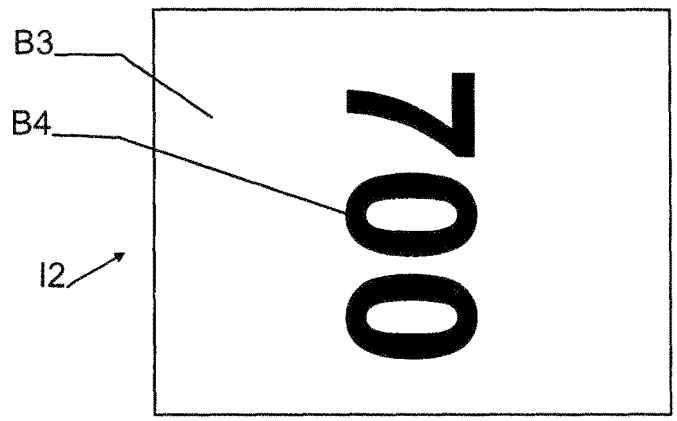

FIG. 4 shows a second security information item I2 ("700" lettering) with a third area B3 outside the lettering (white area) and a fourth area B4 inside the lettering (black area).

Figure 5:
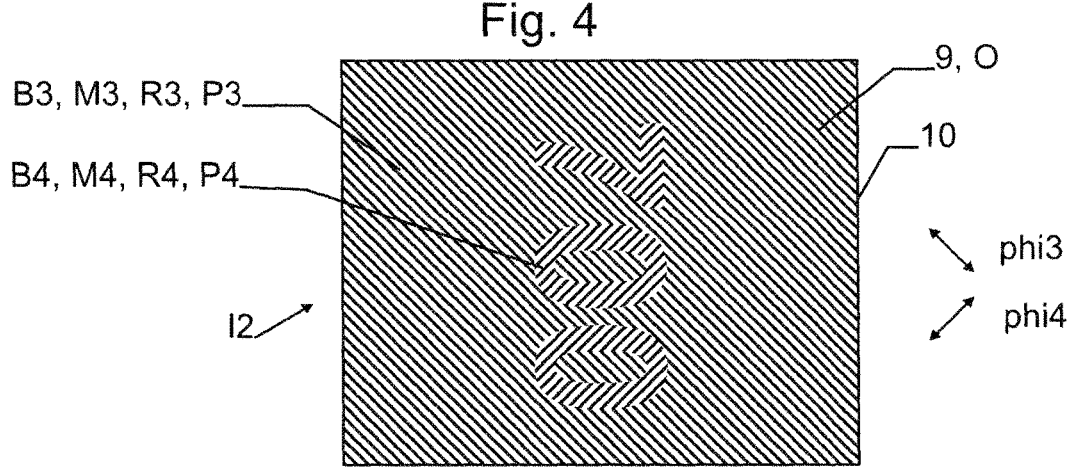

FIG. 5 shows the second security information item I2 from FIG. 4. Here, the third area B3 of the substrate 9 is provided with a third pattern M3 comprising a printed line grid R3 (oblique to the lower right when viewing the figure straight on) on the substrate surface O and an embossed structure P3 (not shown) of the substrate 9. Pattern M3 has a grid width of 50 lines per centimeter and a grid angle phi3=45° (measured relative to a vertical side of the substrate 9 counterclockwise). The fourth area B4 of the substrate 9 is provided with a fourth pattern M4 comprising a printed line grid R4 (oblique to the lower left when viewing the figure straight on) on the substrate surface O and an embossed structure P4 (not shown) of the substrate 9. Pattern M4 has a grid width of 50 lines per centimeter and a grid angle phi2=135° (measured relative to a vertical side of the substrate 9 counterclockwise).

Figure 6:
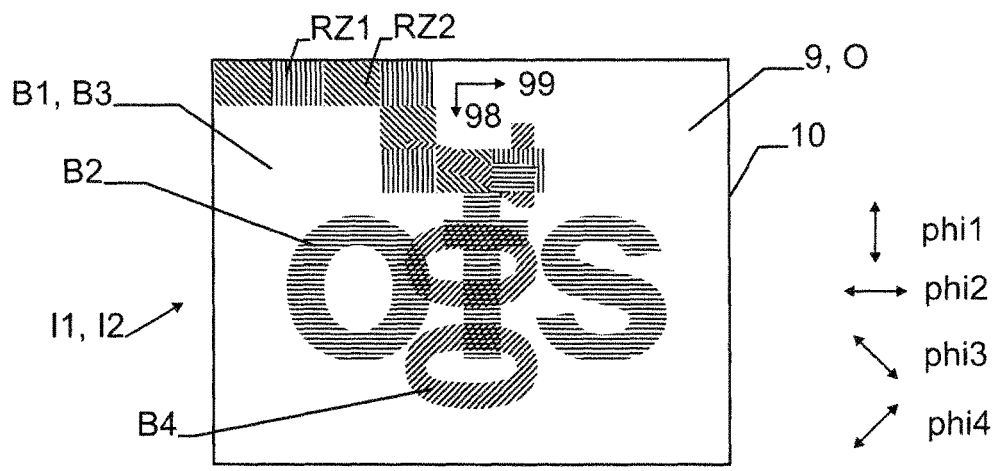

FIG. 6 shows square grid cells RZ1, RZ2 on the substrate surface O of substrate 9, the grid cells disposed in alternating fashion in a first and a second direction 99, 98 according to the invention. Sections B1 and B3 as well as B2 and B4 from FIGS. 2-5 partially overlap one another. To explain the security feature according to the invention, eight grid cells RZ1, RZ2 are shown. It is shown that the grid cells RZ1 and RZ2 are arranged next to one another in non-overlapping fashion on the substrate and that the first and second patterns M1, M2 (and the associated line grids R1, R2 and embossed structures P1, P2) are arranged exclusively in the first grid cells RZ1. The third and fourth patterns M3, M4 (and the associated line grids R3, R4 and embossed structures P3, P4) are arranged exclusively in the second grid cells RZ2.

Figure 7:
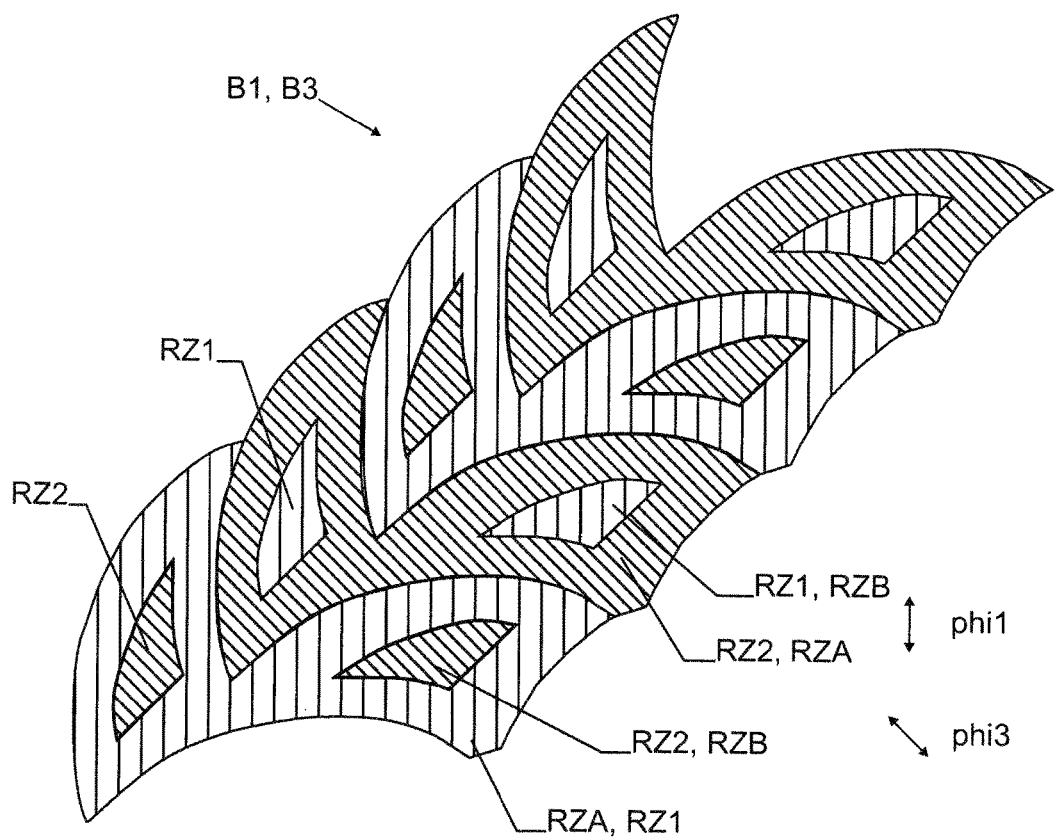

FIG. 7 shows non-square first and second grid cells RZ1, RZ2 in areas B1/B3 (in other words outside the lettering), wherein the grid cells RZ1 and RZ2 each comprise first and second grid cell types RZA and RZB. The first grid cell types RZA are designed such that they surround the second grid cell types RZB. Here, the grid cell types RZA and RZB only refer to the shape of the grid cells and must not be confused with the "contents" thereof, in other words the association thereof with the first grid cells RZ1 and RZ2. Since the grid cells shown are those in areas B1/B3, they are shown together with patterns M1 and M3. The contour lines of grid cells RZ1, RZ2 are not printed, but only serve to provide clarity here.

Figure 8:
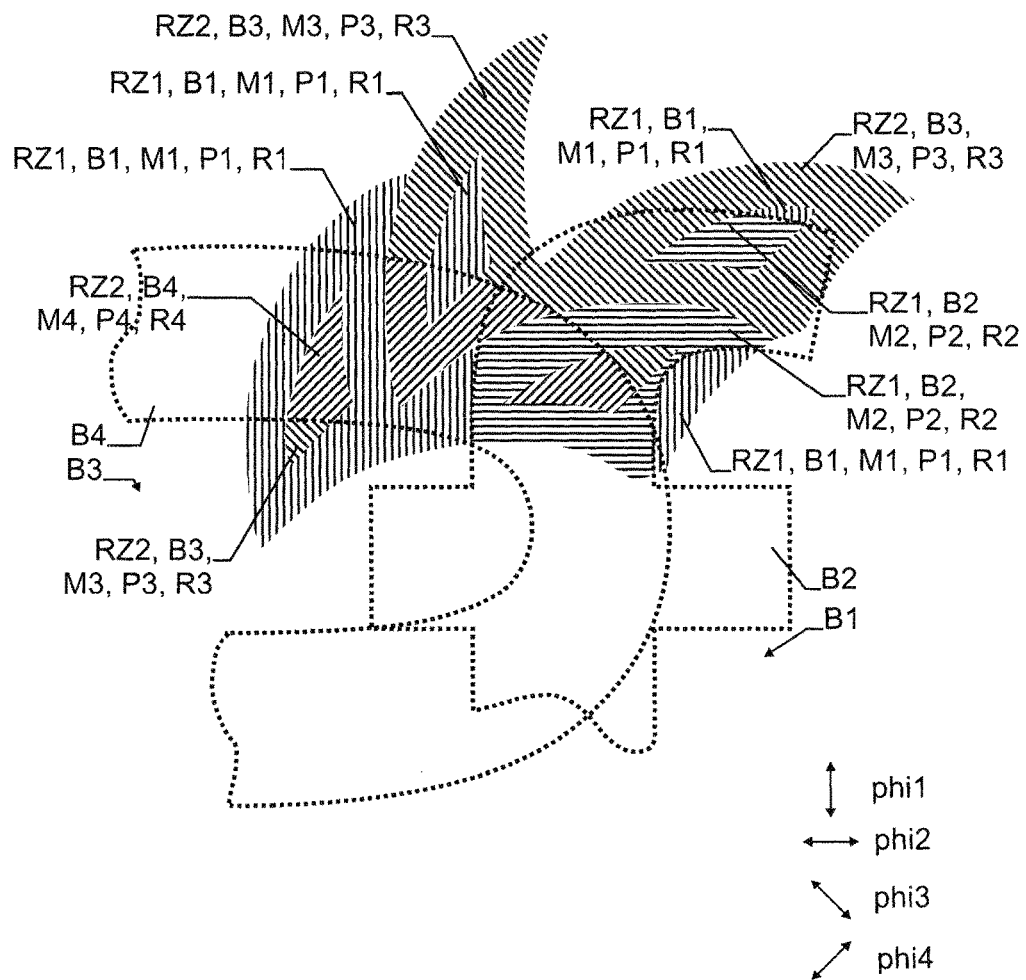

FIG. 8 shows a combination of the grid cells of FIG. 6 distributed according to the invention with the grid cells of FIG. 7, and it illustrates the areas B1, B2, B3 B4 with patterns M1, M2, M3, M4, line grids L1, L2, L3, L4 and embossed structures P1, P2, P3, P4. As described above, this also shows that pattern M1 is disposed in the first grid cells RZ1 of both grid cell types RZA and RZB in area B1 and pattern M2 is disposed in the second area B2. In the second grid cells RZ2 of both grid cell types, pattern M3 is disposed in the third area B3 and pattern M4 is disposed in the fourth area B4. The arrangement of patterns M1-M4 implies the arrangement of the respective embossed structures P1-P4 and line grids R1-R4. Sections B1-B4 are indicated by dotted contour lines with letter "f" for security information item I1 and letter "0" for security information item I2.

Figure 9:
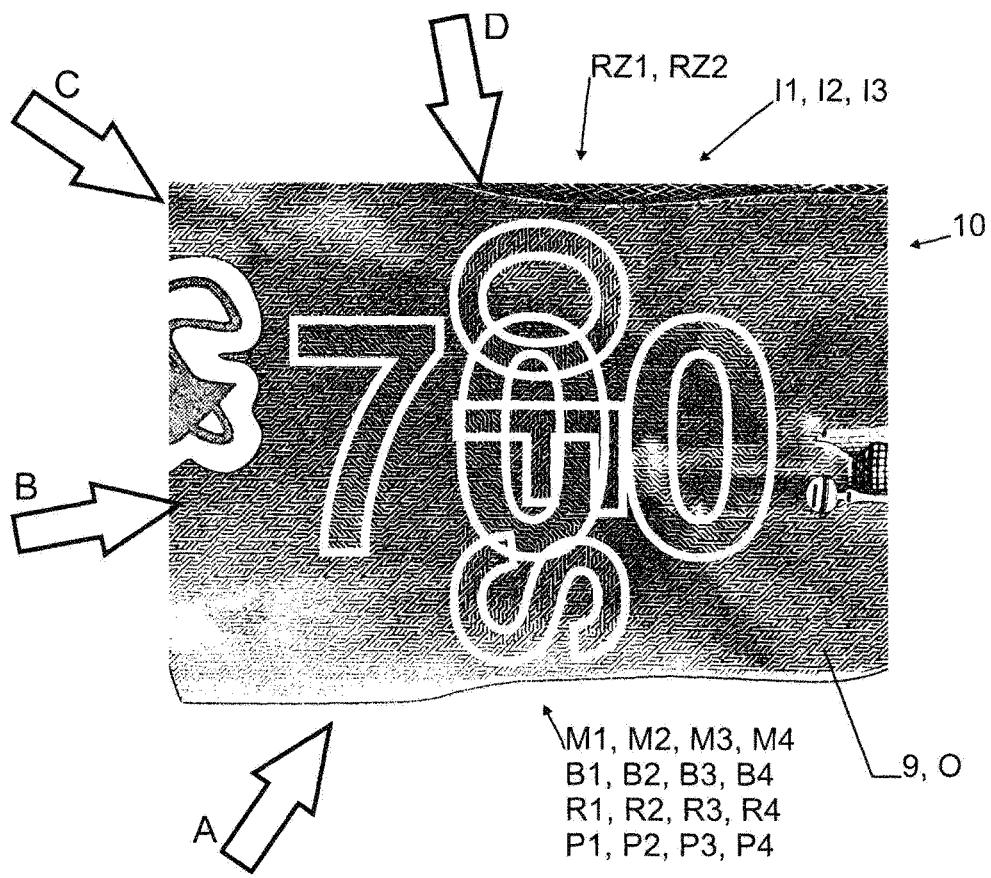

FIG. 9 shows the surface O of a substrate 9 of a security feature 10 according to the invention when viewed straight on (from above). In the process, a third security information item I3 is identifiable (gray-scale distribution in the background image). Also shown schematically are four different oblique viewing directions A, B, C and D. A polar angle measured from the surface O of viewing directions A-D is between 5 and 35 degrees, for example, but can also assume other values depending on the embossed structures. A first and second security information item I1 and I2 are also shown schematically, but they are not observable when viewed straight on. It should be noted at this point that that the azimuth angles phi1, phi2, phi3 and phi4 of patterns M1, M2, M3, M4 discussed so far do not correspond viewing directions A, B, C and D in this embodiment. Also, the white borders of security information items I1, I2 are only shown for purposes of clarity and are of course not printed.

Figure 10:

FIG. 10 shows the surface O of the substrate 9 of the security feature 10 of FIG. 9 from an oblique view from viewing direction A. In the process, the first security information item "OFS" is clearly identifiable as a lighter area on a darker background.

Figure 11:

FIG. 11 shows the surface O of the substrate 9 of the security feature 10 of FIG. 9 from an oblique view from viewing direction B. In the process, the second security information item "700" is clearly identifiable as a darker area on a lighter background.

Figure 12:

FIG. 12 shows the surface O of the substrate 9 of the security feature 10 of FIG. 9 from an oblique view from viewing direction C. In the process, the second security information item "OFS" is again clearly identifiable as a darker area on a lighter background.

Figure 13:
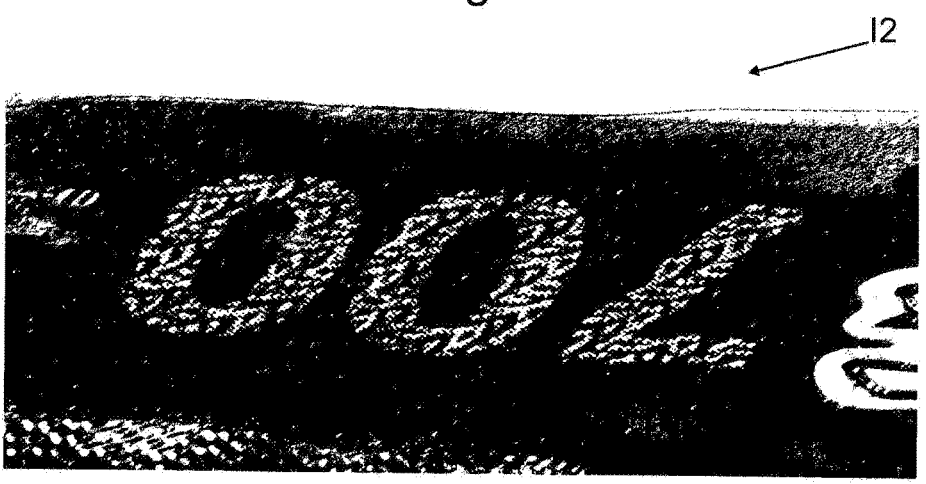

FIG. 13 shows the surface O of the substrate 9 of the security feature 10 of FIG. 9 from an oblique view from viewing direction D. In the process, the first security information item "700" is clearly identifiable as a lighter area on a darker background.

The color change of the security information items are achieved by way of the arrangement of line grids on the sides of the embossed structures.

Figure 14:
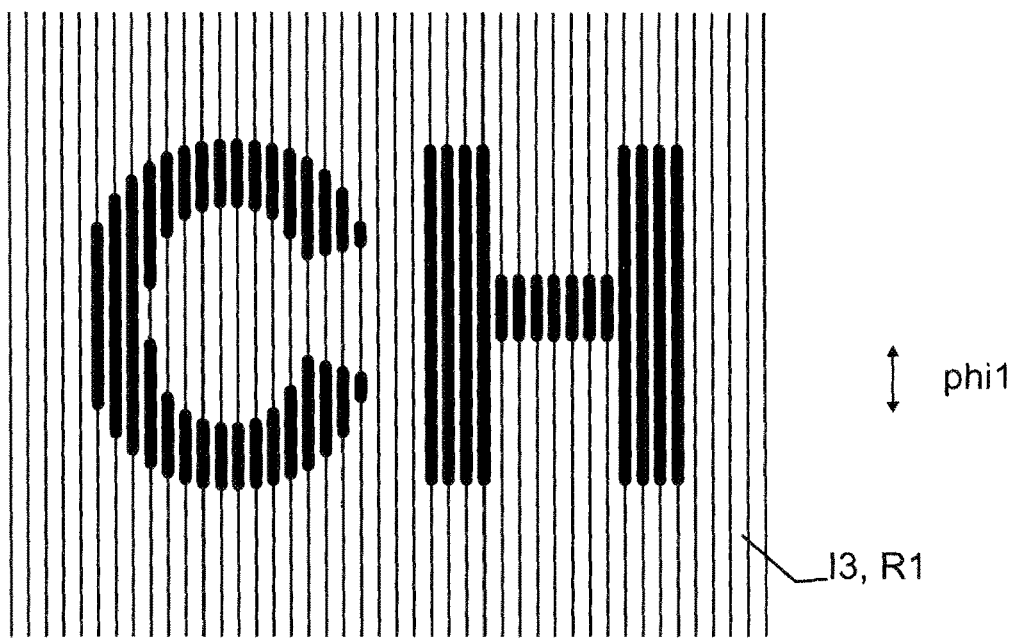

FIG. 14 shows a third security information item I3 (lettering "CH") with a localized variation of a pattern parameter. Here, a line thickness of a vertical line grid R1 is increased within the lettering.

Figure 15:
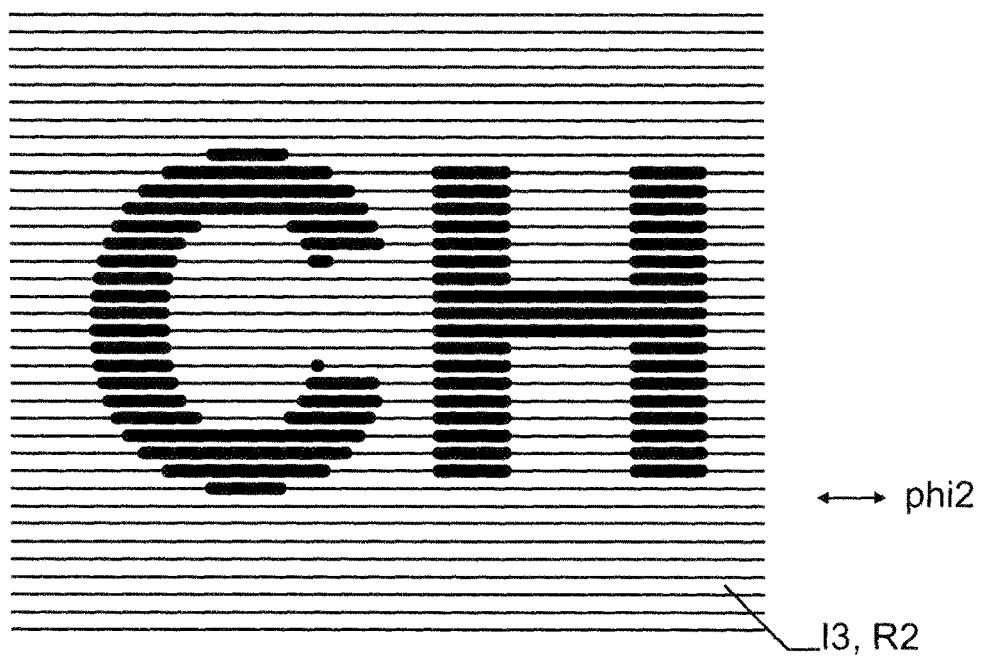

FIG. 15 shows the third security information item I3 from FIG. 14 with a localized variation of a pattern parameter. Here, a line thickness of a horizontal line grid R2 is increased within the lettering.

This allows the third security information item to be arranged independently of the first and second security information items, and is used to disguise the first two security information items.

It should again be noted at this point that any highlighting of the grid cell area is only done to provide clarity and are not printed in the security feature.

While there are shown and described presently preferred embodiments of the invention, it is to be distinctly understood that the invention is not limited thereto but may be otherwise variously embodied and practiced within the scope of the following claims. In the process, it is obvious to one skilled in the art that the features of the individual embodiments described are not limited thereto, but can be arbitrarily combined without deviating from the inventive idea.

The invention claimed is:

1. A security element for a security document, the security element comprising
a substrate with a surface,
at least a first, a second, a third and a fourth pattern with a first, a second, a third and a fourth pattern angle, each pattern comprising an embossed structure on the substrate, wherein the embossed structures are designed such that when the substrate surface is viewed perpendicularly from above, the patterns are visible and when the substrate surface is viewed at an oblique angle from at least one predetermined viewing direction, at least a part of at least one of the patterns is occluded by at least a part of at least one of the embossed structures such that a visual latent image effect occurs when the viewing of the substrate surface is changed between perpendicular from above and oblique,
a first security information item configured as a first localized distribution of the first and second patterns, the first distribution comprising a first area and a second area of the substrate, wherein the first pattern is disposed in at least part of the first area and wherein the second pattern is disposed in at least part of the second area,
a second security information item configured as a second localized distribution of the third and fourth patterns, the second distribution comprising a third area and a fourth area of the substrate, wherein the third pattern is disposed in at least part of the third area and wherein the fourth pattern is disposed in at least part of the fourth area,
wherein the first security information item and the second security information item are arranged at least partially overlapping such that the amount of information in the security element is increased by the overlap of the first security information item and the second security information item,
wherein the security element further comprises:
first grid cells, wherein the first pattern and the second pattern are exclusively arranged in the first grid cells,
second grid cells, wherein the third pattern and the fourth pattern are exclusively arranged in the second grid cells,
wherein the first grid cells and the second grid cells are arranged next to one another in a non-overlapping fashion on the substrate,
wherein the first grid cells and the second grid cells are arranged in a first and in a second direction parallel to the substrate on at least a part of the substrate in a mutually alternating fashion,
wherein the first grid cells and the second grid cells each comprise first grid cell types and differently designed second grid cell types, and
wherein the first grid cell types are designed such that they surround the second grid cell types.

2. The security element according to claim 1, wherein the first area and the third area are designed to be at least partially overlapping and/or wherein the second area and the fourth area are designed to be at least partially overlapping.

3. The security element according to claim 1, wherein at least one of the patterns further comprises a grid with at least one dye that contrasts with the substrate.

4. The security element according to claim 3, wherein at least one of the grids comprises at least two dyes which contrast with the substrate and with one another.

5. The security element according to claim 3, wherein at least one of the grids is disposed predominantly on one side of the embossed structure associated with the respective grid.

6. The security element according to claim 1, wherein at least one of the patterns is designed such that it has a linear shape at least in areas.

7. The security element according to claim 1, wherein the first grid cells and the second grid cells are arranged on the substrate in a periodically-repeating fashion, at least on part of the substrate, parallel to the substrate in a first and a second direction.

8. The security element according to claim 1, wherein the first and the second grid cells are designed such that a total area covered by the first grid cell is from 70 to 130% of a total area covered by the second grid cells.

9. The security element according to claim 1, wherein a pattern width of the first, second, third and/or the fourth pattern is between 30 and 60 lines per centimeter.

10. The security element according to claim 1, wherein an angle difference between the first and the second pattern angle, between the second and the third pattern angle and between the third and the fourth pattern angle is at least 15°.

11. The security element according to claim 10, wherein an angle difference between the first and the second pattern angle and between the third and the fourth pattern angle is 90° and wherein an angle difference between the second and the third pattern angle is 45°.

12. The security element according to claim 1, further comprising a third security information item, wherein the third security information item is designed as a localized variation of at least the first, the second, the third or the fourth pattern.

13. The security element according to claim 12, wherein the variation of the pattern is designed as a modulation of a pattern parameter.

14. The security element according claim 1, comprising a fifth pattern and a further security information item, which is configured as a combination of the fifth pattern with at least one pattern from the group consisting of the first, the second, the third and the fourth pattern.

15. A security document comprising a security element according to claim 1.

16. A method for producing a security element according to claim 1, the method comprising the following steps:
applying a first pattern at a first pattern angle, including a first embossed structure, onto at least part of a first area of a substrate,
applying a second pattern at a second pattern angle, including a second embossed structure, onto at least part of a second area of the substrate,
applying a third pattern at a third pattern angle, including a third embossed structure, onto at least part of a third area of the substrate,
applying a fourth pattern at a fourth pattern angle, including a fourth embossed structure, onto at least part of a fourth area of the substrate,
such that a first security information item is configured as a first localized distribution of the first and second patterns, the first localized distribution comprising the first area and the second area of the substrate,
such that a second security information item is configured as a second localized distribution of the third and fourth patterns, the second localized distribution comprising the third area and the fourth area of the substrate, and such that the first security information item and the second security information item are arranged at least partially overlapping such that the amount of information in the security element is increased by the overlap of the first security information item and the second security information item.

17. The method according to claim 16, further comprising the following step:

applying a first, a second, a third and/or a fourth grid, each of which is associated with one of the patterns, onto the substrate.

18. A method for confirming authenticity of a security document comprising a security element according to claim 1, the method comprising the following steps:

viewing the security document from a first viewing direction and comparing a first viewed intensity distribution with a first template, viewing the security document from a second viewing direction and comparing a second viewed intensity distribution with a second template, using the first and the second viewed intensity distributions, for classifying the security document as authentic or inauthentic.

19. The security element according to claim 1, wherein for each pair of a first and a second grid cell, the pair comprising a first grid cell type and a second grid cell type being surrounded by the first grid cell type, either the first pattern and the second pattern are arranged exclusively in the first grid cell type and the third pattern and the fourth pattern are arranged exclusively in the second grid cell type or the first pattern and the second pattern are arranged exclusively in the second grid cell type and the third pattern and the fourth pattern are arranged exclusively in the first grid cell type.

20. The security element according to claim 1, wherein the first and the second grid cells are designed such that a total area covered by the first grid cell is from 98 to 102% of a total area covered by the second grid cells.

21. The security element according to claim 1, wherein a pattern width of the first, second, third and/or the fourth pattern is between 48 and 52 lines per centimeter.

22. The security element according to claim 12, wherein the third security information item is designed as a localized variation of the first and the second pattern.

23. The security element according to claim 12, wherein the variation of the pattern is designed as a modulation of a line width and/or an embossed structure depth.

* * * * *